US010212666B2

(12) United States Patent
Bi et al.

(10) Patent No.: US 10,212,666 B2
(45) Date of Patent: Feb. 19, 2019

(54) USER EQUIPMENT AND METHOD FOR CONTROLLING USER EQUIPMENT

(71) Applicant: Huawei Technologies Co., Ltd., Shenzhen (CN)

(72) Inventors: Xiaoyan Bi, Shanghai (CN); Dageng Chen, Shanghai (CN); Rongdao Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/462,516

(22) Filed: Mar. 17, 2017

(65) Prior Publication Data
US 2017/0195967 A1    Jul. 6, 2017

Related U.S. Application Data

(63) Continuation of application No. PCT/CN2014/089172, filed on Oct. 22, 2014.

(51) Int. Cl.
*H04W 52/02* (2009.01)
*H04W 8/22* (2009.01)

(52) U.S. Cl.
CPC ......... *H04W 52/0254* (2013.01); *H04W 8/22* (2013.01); *H04W 52/0251* (2013.01);
(Continued)

(58) Field of Classification Search
CPC ............... H04W 52/0254; H04W 8/22; H04W 52/0251; H04W 52/0274; Y02D 70/1222;
(Continued)

(56) References Cited

U.S. PATENT DOCUMENTS

| 2011/0151824 | A1 | 6/2011 | Dai | |
|---|---|---|---|---|
| 2014/0094162 | A1* | 4/2014 | Heo | H04W 52/0258 455/422.1 |
| 2016/0209907 | A1* | 7/2016 | Han | G06F 1/3209 |

FOREIGN PATENT DOCUMENTS

| CN | 101146299 A | 3/2008 |
|---|---|---|
| CN | 101299841 A | 11/2008 |

(Continued)

*Primary Examiner* — Nay A Maung
*Assistant Examiner* — Angelica M Perez
(74) *Attorney, Agent, or Firm* — Leydig, Voit & Mayer, Ltd.

(57) ABSTRACT

Disclosed is a UE and a method for controlling the UE. The UE includes: an input/output (I/O) module, configured to display an intelligent-shutdown-mode setting interface, where the intelligent-shutdown-mode setting interface includes a setting option for shutting down/starting a radio frequency chain of the UE, obtain setting information of the user on the intelligent-shutdown-mode setting interface, and send the setting information to an intelligent shutdown module; the intelligent shutdown module, configured to receive the setting information sent by the I/O module, modify wireless transmission capability report information of the UE according to the setting information, send modified wireless transmission capability report information to a communications module, and shut down/start the radio frequency chain of the UE; and the communications module, configured to receive the modified wireless transmission capability report information that is sent by the intelligent shutdown module, and send the modified wireless transmission capability report information to a base station.

6 Claims, 5 Drawing Sheets (52) U.S. Cl.
CPC ......... *H04W 52/0274* (2013.01); *Y02D 70/00* (2018.01); *Y02D 70/1222* (2018.01); *Y02D 70/1224* (2018.01); *Y02D 70/1242* (2018.01); *Y02D 70/1262* (2018.01); *Y02D 70/1264* (2018.01); *Y02D 70/146* (2018.01)

(58) Field of Classification Search
CPC ........... Y02D 70/1264; Y02D 70/1224; Y02D 70/146; Y02D 70/00; Y02D 70/1262; Y02D 70/1242
See application file for complete search history.

(56) References Cited

FOREIGN PATENT DOCUMENTS

| | | | |
|---|---|---|---|
| CN | 101801070 A | | 8/2010 |
| CN | 102231780 A | * | 11/2011 |
| WO | WO 2010141383 A2 | | 12/2010 |

* cited by examiner

USER EQUIPMENT AND METHOD FOR CONTROLLING USER EQUIPMENT

CROSS-REFERENCE TO RELATED APPLICATIONS

This application is a continuation of International Application No. PCT/CN2014/089172, filed on Oct. 22, 2014, the disclosure of which is hereby incorporated by reference in its entirety.

TECHNICAL FIELD

The present disclosure relates to the communications field, and more specifically, to user equipment and a method for controlling user equipment.

BACKGROUND

With rapid development of wireless communications technologies, a terminal used by a user is equipped with increasing antennas used for wireless receiving and transmitting. For example, in a Long Term Evolution-Advanced (LTE-A) system, supported by a current standard, user equipment (UE) may be equipped with a maximum of eight transceiver antennas. More antennas have a significant effect on improving a wireless transmission rate of the UE, and can provide better service experience for a future user who has a high data volume requirement.

However, with an increase in a quantity of UE antennas and future enhancement of a UE bearing function, a sharp increase in UE power consumption also becomes a prominent problem. Each transceiver antenna of UE corresponds to one independent internal transceiver channel, which is generally referred to as a radio frequency chain (RF chain). In an existing wireless communications system, all RF chains of the UE are always in a started state once the UE is powered on and accesses a network. That is, all the RF chains configured for the UE are in the enabled state even when a user has no service or a few services, for example, when the UE only has a voice service. This undoubtedly consumes some power, which is a waste for UE that has an urgent requirement for energy conservation.

SUMMARY

Embodiments of the present disclosure provide user equipment and a method for controlling user equipment, so as to implement UE energy saving on the premise that UE communication quality is ensured.

According to a first aspect, UE is provided, including:

an I/O module, configured to display an intelligent-shutdown-mode setting interface to a user, where the intelligent-shutdown-mode setting interface includes a setting option for shutting down/starting a radio frequency chain of the UE; obtain setting information of the user on the intelligent-shutdown-mode setting interface; and send the setting information to an intelligent shutdown module;

the intelligent shutdown module, configured to receive the setting information sent by the I/O module, modify wireless transmission capability report information of the UE according to the setting information, send modified wireless transmission capability report information to a communications module, and shut down/start the radio frequency chain of the UE; and the communications module, configured to receive the modified wireless transmission capability report information that is sent by the intelligent shutdown module, and send the modified wireless transmission capability report information to a base station.

With reference to the first aspect, in a first possible implementation manner, the intelligent shutdown module is specifically configured to: according to the setting information, first shut down/start the radio frequency chain of the UE, then modify the wireless transmission capability report information of the UE, and send the modified wireless transmission capability report information to the communications module.

With reference to the first aspect, in a second possible implementation manner, the communications module is further configured to receive an acknowledgement message sent by the base station, and send the acknowledgement message to the intelligent shutdown module; and the intelligent shutdown module is specifically configured to: according to the setting information, first modify the wireless transmission capability report information of the UE, send the modified wireless transmission capability report information to the communications module, then receive the acknowledgement message sent by the communications module, and then shut down/start the radio frequency chain of the UE.

With reference to the first aspect or the first or the second possible implementation manner of the first aspect, in a third possible implementation manner, the intelligent shutdown module is specifically configured to:

if the setting information is to enable an intelligent shutdown mode, shut down a preset radio frequency chain; or if the setting information is to enable an intelligent shutdown mode and a to-be-shut-down radio frequency chain is set, shut down the to-be-shut-down radio frequency chain; or if the setting information is to disable an intelligent shutdown mode, start a shut-down radio frequency chain.

With reference to any one of the first aspect, or the first to the third possible implementation manners of the first aspect, in a fourth possible implementation manner, the I/O module is further configured to display a setting result on the intelligent-shutdown-mode setting interface to the user.

According to a second aspect, a method for controlling UE is provided, including:

displaying an intelligent-shutdown-mode setting interface to a user, where the intelligent-shutdown-mode setting interface includes a setting option for shutting down/starting a radio frequency chain of the UE; and obtaining setting information of the user on the intelligent-shutdown-mode setting interface; and modifying wireless transmission capability report information of the UE according to the setting information, sending modified wireless transmission capability report information to a base station, and shutting down/starting the radio frequency chain of the UE.

With reference to the second aspect, in a first possible implementation manner, the modifying wireless transmission capability report information of the UE according to the setting information, sending modified wireless transmission capability report information to a base station, and shutting down/starting the radio frequency chain of the UE includes:

according to the setting information, first shutting down/starting the radio frequency chain of the UE, then modifying the wireless transmission capability report information of the UE, and sending the modified wireless transmission capability report information to the base station.

With reference to the second aspect, in a second possible implementation manner, the modifying wireless transmission capability report information of the UE according to the setting information, sending modified wireless transmission capability report information to a base station, and shutting down/starting the radio frequency chain of the UE includes:

according to the setting information, first modifying the wireless transmission capability report information of the UE, sending the modified wireless transmission capability report information to the base station, and then shutting down/starting the radio frequency chain of the UE after receiving an acknowledgement message sent by the base station.

With reference to the second aspect or the first or the second possible implementation manner of the second aspect, in a third possible implementation manner, the shutting down/starting the radio frequency chain of the UE includes:

if the setting information is to enable an intelligent shutdown mode, shutting down a preset radio frequency chain; or if the setting information is to enable an intelligent shutdown mode and a to-be-shut-down radio frequency chain is set, shutting down the to-be-shut-down radio frequency chain; or if the setting information is to disable an intelligent shutdown mode, starting a shut-down radio frequency chain.

With reference to any one of the second aspect, or the first to the third possible implementation manners of the second aspect, in a fourth possible implementation manner, the method further includes:

displaying a setting result on the intelligent-shutdown-mode setting interface to the user.

Based on the foregoing technical solutions, in the embodiments of the present disclosure, on the premise that UE communication quality is ensured, UE energy saving can be implemented by shutting down/starting a radio frequency chain of UE and modifying wireless transmission capability report information of the UE.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that, the technical solutions of the embodiments of the present disclosure may be applied to various communications systems, such as: a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, an LTE-A system, a Universal Mobile Telecommunications System (UMTS), and a Worldwide Interoperability for Microwave Access (WiMAX) communications system.

It should also be understood that in the embodiments of the present disclosure, user equipment (UE) may be referred to as a terminal, a mobile station (MS), a mobile terminal, and the like. The user equipment may communicate with one or more core networks by using a radio access network (RAN). For example, the user equipment may be a mobile phone (also referred to as a cellular phone) or a computer with a mobile terminal. For example, the user equipment may also be a portable, pocket-sized, handheld, computer built-in, or in-vehicle mobile apparatus, which exchanges voice and/or data with the radio access network.

In the embodiments of the present disclosure, a base station may be a base station (Base Transceiver Station or BTS) in GSM or CDMA, may be a base station (NodeB or NB) in WCDMA, or may be an evolved NodeB (evolved Node B or eNB or e-NodeB) in LTE, which is not limited in the present disclosure.

Figure 1:
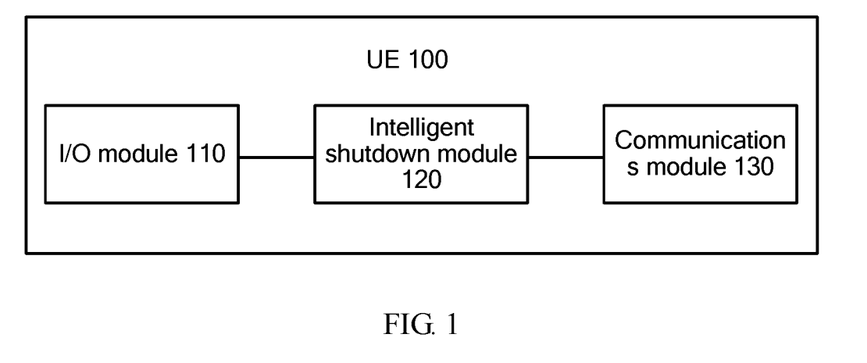
FIG. 1 is a schematic block diagram of UE according to an embodiment of the present disclosure.

FIG. 1 shows a schematic block diagram of UE 100 according to an embodiment of the present disclosure. As shown in FIG. 1, the UE 100 includes an input/output (I/O) module 110, an intelligent shutdown module 120, and a communications module 130.

The I/O module 110 is configured to display an intelligent-shutdown-mode setting interface to a user, where the intelligent-shutdown-mode setting interface includes a setting option for shutting down/starting a radio frequency chain of the UE; obtain setting information of the user on the intelligent-shutdown-mode setting interface; and send the setting information to the intelligent shutdown module 120.

The intelligent shutdown module 120 is configured to receive the setting information sent by the I/O module 110, modify wireless transmission capability report information of the UE according to the setting information, send modified wireless transmission capability report information to the communications module 130, and shut down/start the radio frequency chain of the UE.

The communications module 130 is configured to receive the modified wireless transmission capability report information that is sent by the intelligent shutdown module 120, and send the modified wireless transmission capability report information to a base station.

According to the UE in this embodiment of the present disclosure, on the premise that UE communication quality is ensured, UE energy saving can be implemented by shutting down/starting a radio frequency chain of the UE and modifying wireless transmission capability report information of the UE.

The I/O module 110 may be specifically an input and output device of the UE 100, for example, a touchscreen. The I/O module 110 can provide the intelligent-shutdown-mode setting interface for the user, where the intelligent-shutdown-mode setting interface includes the setting option for shutting down/starting the radio frequency chain of the UE.

Figure 2A:
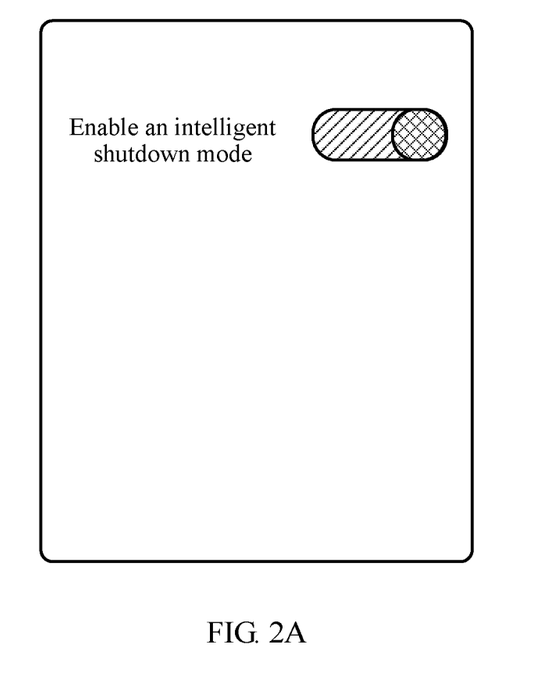
FIG. 2A is a schematic diagram of an intelligent-shutdown-mode setting interface according to an embodiment of the present disclosure.
Figure 2B:
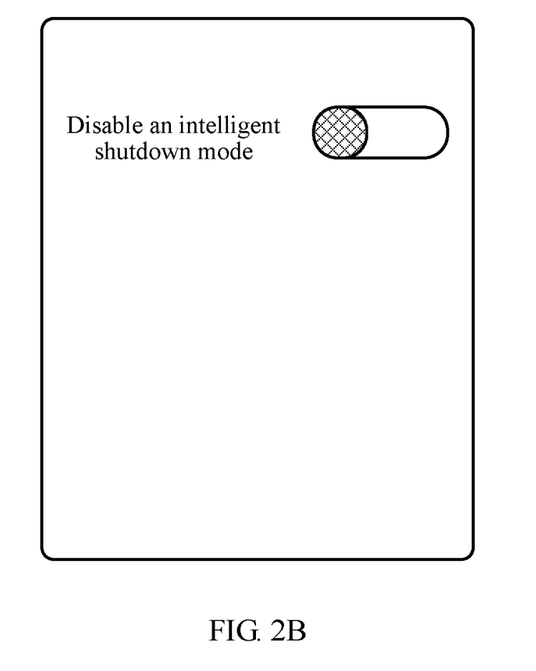
FIG. 2B is another schematic diagram of an intelligent-shutdown-mode setting interface according to an embodiment of the present disclosure.

Optionally, the setting option may be enabling an intelligent shutdown mode or disabling an intelligent shutdown mode, as shown in FIG. 2A and FIG. 2B. Enabling an intelligent shutdown mode may correspond to shutting down a preset radio frequency chain, and disabling an intelligent shutdown mode may correspond to starting a shut-down radio frequency chain.

Optionally, an option for a to-be-shut-down/to-be-started radio frequency chain may be further included, for example, a quantity, a sequence number, or a location of the to-be-shut-down/to-be-started radio frequency chain. Optionally, these options may be under the option for enabling the intelligent shutdown mode. In this way, if the intelligent shutdown mode is enabled, the user may further set the to-be-shut-down/to-be-started radio frequency chain. The user enabling the intelligent shutdown mode and setting a to-be-shut-down radio frequency chain corresponds to shutting down the to-be-shut-down radio frequency chain.

It should be understood that the foregoing option for enabling the intelligent shutdown mode or disabling the intelligent shutdown mode may be replaced with an option for shutting down a radio frequency chain or starting a radio frequency chain. That is, the setting option may be shutting down a radio frequency chain or starting a radio frequency chain, and may further include an option for a to-be-shut-down/to-be-started radio frequency chain. If there is no option for a to-be-shut-down/to-be-started radio frequency chain, shutting down a radio frequency chain may correspond to shutting down a preset radio frequency chain, and starting a radio frequency chain may correspond to starting a shut-down radio frequency chain; or if there is an option for a to-be-shut-down/to-be-started radio frequency chain, the user choosing to shut down a radio frequency chain and setting a to-be-shut-down radio frequency chain corresponds to shutting down the to-be-shut-down radio frequency chain.

After the user performs setting on the intelligent-shutdown-mode setting interface, the I/O module 110 obtains the setting information of the user on the intelligent-shutdown-mode setting interface, and sends the setting information to the intelligent shutdown module 120.

After receiving the setting information, the intelligent shutdown module 120, on the one hand, modifies the wireless transmission capability report information of the UE and sends the modified wireless transmission capability report information to the communications module 130, and on the other hand, shuts down/starts the radio frequency chain of the UE.

Figure 3:
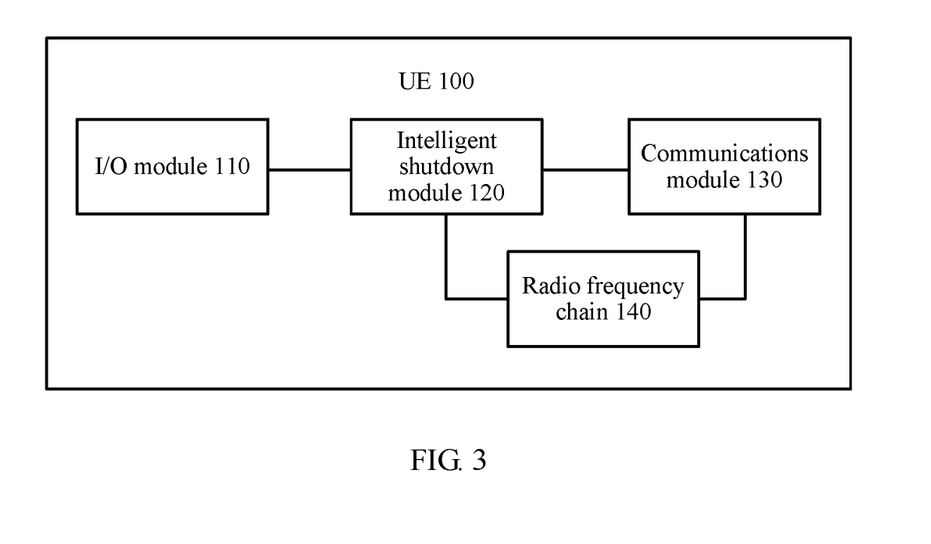
FIG. 3 is a schematic block diagram of UE according to another embodiment of the present disclosure.

As shown in FIG. 3, the intelligent shutdown module 120 may control shutdown/starting of a radio frequency chain 140. Optionally, the intelligent shutdown module 120 may directly shut down/start the radio frequency chain 140 of the UE, or may shut down/start the radio frequency chain 140 of the UE after obtaining acknowledgement from the base station.

Optionally, in an embodiment of the present disclosure, the intelligent shutdown module 120 is specifically configured to: according to the setting information, first shut down/start the radio frequency chain of the UE, then modify the wireless transmission capability report information of the UE, and send the modified wireless transmission capability report information to the communications module 130.

In this embodiment, the intelligent shutdown module 120 directly shuts down/starts the radio frequency chain of the UE. That is, after receiving the setting information of the user, the intelligent shutdown module 120 directly shuts down/starts the radio frequency chain of the UE according to the setting information. Optionally, if the setting information is to enable the intelligent shutdown mode, a preset radio frequency chain is shut down; if the setting information is to enable the intelligent shutdown mode and a to-be-shut-down radio frequency chain is set, the to-be-shut-down radio frequency chain is shut down; or if the setting information is to disable the intelligent shutdown mode, a shut-down radio frequency chain is started. Then, the intelligent shutdown module 120 modifies the wireless transmission capability report information of the UE, where the wireless transmission capability report information of the UE is modified to be corresponding to the setting information, that is, modified to be corresponding to the foregoing setting result; and sends the modified wireless transmission capability report information to the communications module 130. The communications module 130 receives the modified wireless transmission capability report information that is sent by the intelligent shutdown module 120, and sends the modified wireless transmission capability report information to the base station. In this way, the base station can learn the modified wireless transmission capability report information of the UE, and communicate with the UE according to the modified wireless transmission capability report information, so as to ensure normal communication with the UE. In addition, because shutting down a corresponding radio frequency chain can save energy, in this embodiment of the present disclosure, UE energy saving can be implemented on the premise that UE communication quality is ensured.

Optionally, in another embodiment of the present disclosure, the communications module 130 is further configured to receive an acknowledgement message sent by the base station, and send the acknowledgement message to the intelligent shutdown module 120.

The intelligent shutdown module 120 is specifically configured to: according to the setting information, first modify the wireless transmission capability report information of the UE, send the modified wireless transmission capability report information to the communications module 130, then receive the acknowledgement message sent by the communications module 130, and then shut down/start the radio frequency chain of the UE.

In this embodiment, the UE shuts down/starts the radio frequency chain of the UE after negotiating with the base station, that is, the intelligent shutdown module 120 shuts down/starts the radio frequency chain of the UE after obtaining acknowledgement from the base station. Specifically, after receiving the setting information of the user, the intelligent shutdown module 120 modifies the wireless transmission capability report information of the UE according to the setting information, where the wireless transmission capability report information of the UE is modified to be corresponding to the setting information, and sends the modified wireless transmission capability report information to the communications module 130. After receiving the modified wireless transmission capability report information that is sent by the intelligent shutdown module 120, the communications module 130 sends the modified wireless transmission capability report information to the base station. After acknowledging the modified wireless transmission capability report information, the base station sends the acknowledgement message to the communications module 130. After receiving the acknowledgement message sent by the base station, the communications module 130 sends the acknowledgement message to the intelligent shutdown module 120. After receiving the acknowledgement message sent by the communications module 130, the intelligent shutdown module 120 shuts down/starts the radio frequency chain of the UE. Optionally, if the setting information is to enable the intelligent shutdown mode, a preset radio frequency chain is shut down; if the setting information is to enable the intelligent shutdown mode and a to-be-shut-down radio frequency chain is set, the to-be-shut-down radio frequency chain is shut down; or if the setting information is to disable the intelligent shutdown mode, a shut-down radio frequency chain is started. After the base station acknowledges the modified wireless transmission capability report information of the UE, the UE shuts down/starts the radio frequency chain of the UE, and the base station may communicate with the UE according to the modified wireless transmission capability report information, so as to ensure normal communication with the UE. In addition, because shutting down a corresponding radio frequency chain can save energy, in this embodiment of the present disclosure, UE energy saving can be implemented on the premise that UE communication quality is ensured.

In this embodiment of the present disclosure, optionally, the I/O module 110 is further configured to display a setting result on the intelligent-shutdown-mode setting interface to the user. That is, after the foregoing corresponding setting is finished, the I/O module 110 displays the setting result on the intelligent-shutdown-mode setting interface to the user.

Therefore, according to the UE in this embodiment of the present disclosure, on the premise that UE communication quality is ensured, UE energy saving can be implemented by shutting down/starting a radio frequency chain of the UE and modifying wireless transmission capability report information of the UE. In addition, user experience can be improved by providing an operable intelligent-shutdown-mode setting interface to a user.

The foregoing describes the user equipment according to the embodiments of the present disclosure in detail, and the following describes a method for controlling user equipment according to an embodiment of the present disclosure in detail.

Figure 4:
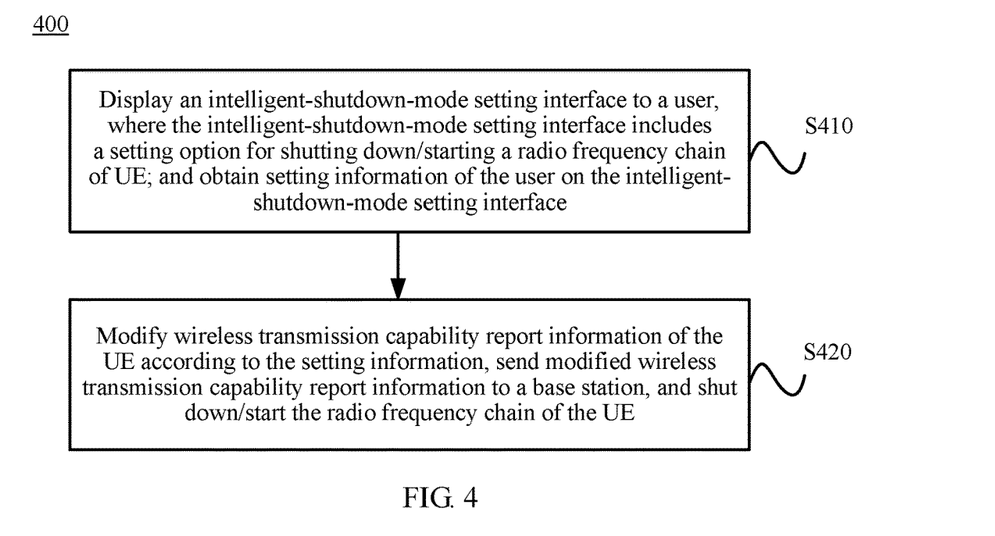
FIG. 4 is a schematic flowchart of a method for controlling UE according to an embodiment of the present disclosure.

FIG. 4 shows a schematic flowchart of a method 400 for controlling UE according to an embodiment of the present disclosure. As shown in FIG. 4, the method 400 includes the following steps:

S410. Display an intelligent-shutdown-mode setting interface to a user, where the intelligent-shutdown-mode setting interface includes a setting option for shutting down/starting a radio frequency chain of the UE; and obtain setting information of the user on the intelligent-shutdown-mode setting interface.

S420. Modify wireless transmission capability report information of the UE according to the setting information, send modified wireless transmission capability report information to a base station, and shut down/start the radio frequency chain of the UE.

In the method for controlling UE in this embodiment of the present disclosure, on the premise that UE communication quality is ensured, UE energy saving can be implemented by shutting down/starting a radio frequency chain of the UE and modifying wireless transmission capability report information of the UE.

In this embodiment of the present disclosure, the intelligent-shutdown-mode setting interface is provided for the user, where the intelligent-shutdown-mode setting interface includes the setting option for shutting down/starting the radio frequency chain of the UE.

Optionally, the setting option may be enabling an intelligent shutdown mode or disabling an intelligent shutdown mode, as shown in FIG. 2A and FIG. 2B. Enabling an intelligent shutdown mode may correspond to shutting down a preset radio frequency chain, and disabling an intelligent shutdown mode may correspond to starting a shut-down radio frequency chain.

Optionally, an option for a to-be-shut-down/to-be-started radio frequency chain may be further included, for example, a quantity, a sequence number, or a location of the to-be-shut-down/to-be-started radio frequency chain. Optionally, these options may be under the option for enabling the intelligent shutdown mode. In this way, if the intelligent shutdown mode is enabled, the user may further set the to-be-shut-down/to-be-started radio frequency chain. The user enabling the intelligent shutdown mode and setting a to-be-shut-down radio frequency chain corresponds to shutting down the to-be-shut-down radio frequency chain.

The foregoing option for enabling the intelligent shutdown mode or disabling the intelligent shutdown mode may be replaced with an option for shutting down a radio frequency chain or starting a radio frequency chain. That is, the setting option may be shutting down a radio frequency chain or starting a radio frequency chain, and may further include an option for a to-be-shut-down/to-be-started radio frequency chain. If there is no option for a to-be-shut-down/to-be-started radio frequency chain, shutting down a radio frequency chain may correspond to shutting down a preset radio frequency chain, and starting a radio frequency chain may correspond to starting a shut-down radio frequency chain; or if there is an option for a to-be-shut-down/to-be-started radio frequency chain, the user choosing to shut down a radio frequency chain and setting a to-be-shut-down radio frequency chain corresponds to shutting down the to-be-shut-down radio frequency chain.

After the user performs setting on the intelligent-shutdown-mode setting interface, the UE obtains the setting information of the user on the intelligent-shutdown-mode setting interface; and then according to the setting information, on the one hand, modifies the wireless transmission capability report information of the UE and sends the modified wireless transmission capability report information to the base station, and on the other hand, shuts down/starts the radio frequency chain of the UE. The UE may directly shut down/start the radio frequency chain of the UE, or may shut down/start the radio frequency chain of the UE after obtaining acknowledgement from the base station.

Optionally, in an embodiment of the present disclosure, the modifying wireless transmission capability report information of the UE according to the setting information, sending modified wireless transmission capability report information to a base station, and shutting down/starting the radio frequency chain of the UE includes:

according to the setting information, first shutting down/starting the radio frequency chain of the UE, then modifying the wireless transmission capability report information of the UE, and sending the modified wireless transmission capability report information to the base station.

Figure 5:
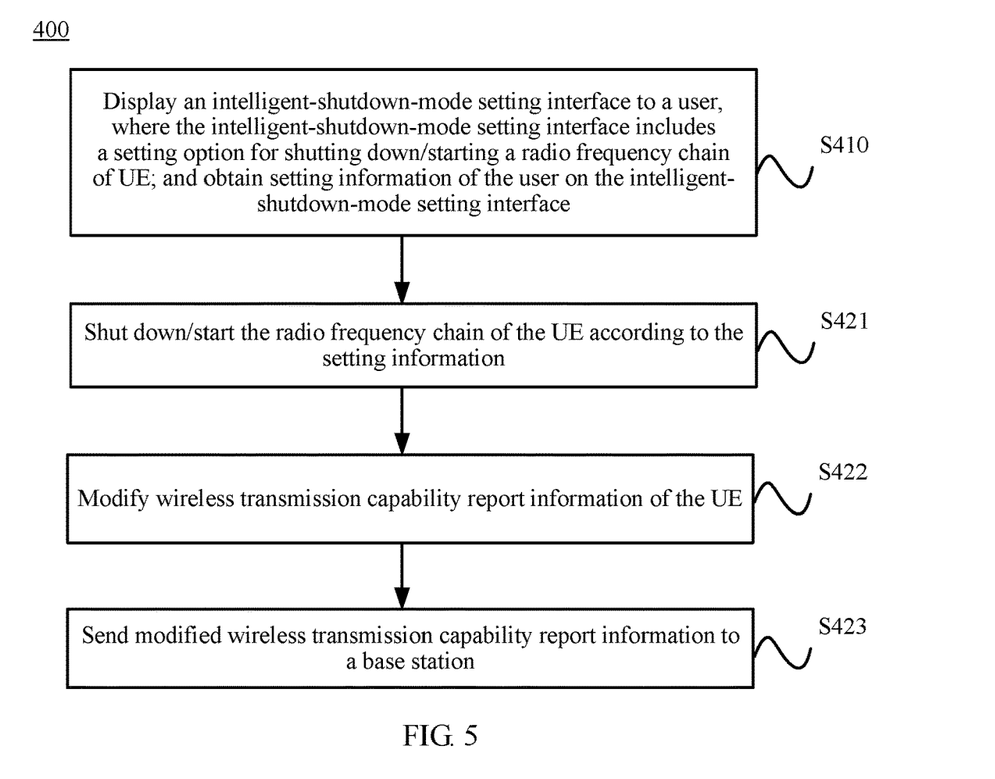
FIG. 5 is a schematic flowchart of a method for controlling UE according to another embodiment of the present disclosure.

As shown in FIG. 5, in this embodiment, the method 400 may specifically include the following steps:

S410. Display the intelligent-shutdown-mode setting interface to the user, where the intelligent-shutdown-mode setting interface includes the setting option for shutting down/starting the radio frequency chain of the UE; and obtain the setting information of the user on the intelligent-shutdown-mode setting interface.

S421. Shut down/start the radio frequency chain of the UE according to the setting information.

S422. Modify the wireless transmission capability report information of the UE.

S423. Send the modified wireless transmission capability report information to the base station.

In this embodiment, the UE directly shuts down/starts the radio frequency chain of the UE. That is, after obtaining the setting information of the user, the UE directly shuts down/starts the radio frequency chain of the UE according to the setting information. Optionally, if the setting information is to enable the intelligent shutdown mode, a preset radio frequency chain is shut down; if the setting information is to enable the intelligent shutdown mode and a to-be-shut-down radio frequency chain is set, the to-be-shut-down radio frequency chain is shut down; or if the setting information is to disable the intelligent shutdown mode, a shut-down radio frequency chain is started. Then, the UE modifies the wireless transmission capability report information of the UE, where the wireless transmission capability report information of the UE is modified to be corresponding to the setting information, that is, modified to be corresponding to the foregoing setting result; and sends the modified wireless transmission capability report information to the base station. In this way, the base station can learn the modified wireless transmission capability report information of the UE, and communicate with the UE according to the modified wireless transmission capability report information, so as to ensure normal communication with the UE. In addition, because shutting down a corresponding radio frequency chain can save energy, in this embodiment of the present disclosure, UE energy saving can be implemented on the premise that UE communication quality is ensured.

Optionally, in another embodiment of the present disclosure, the modifying wireless transmission capability report information of the UE according to the setting information, sending modified wireless transmission capability report information to a base station, and shutting down/starting the radio frequency chain of the UE includes:

according to the setting information, first modifying the wireless transmission capability report information of the UE, sending the modified wireless transmission capability report information to the base station, and then shutting down/starting the radio frequency chain of the UE after receiving an acknowledgement message sent by the base station.

Figure 6:
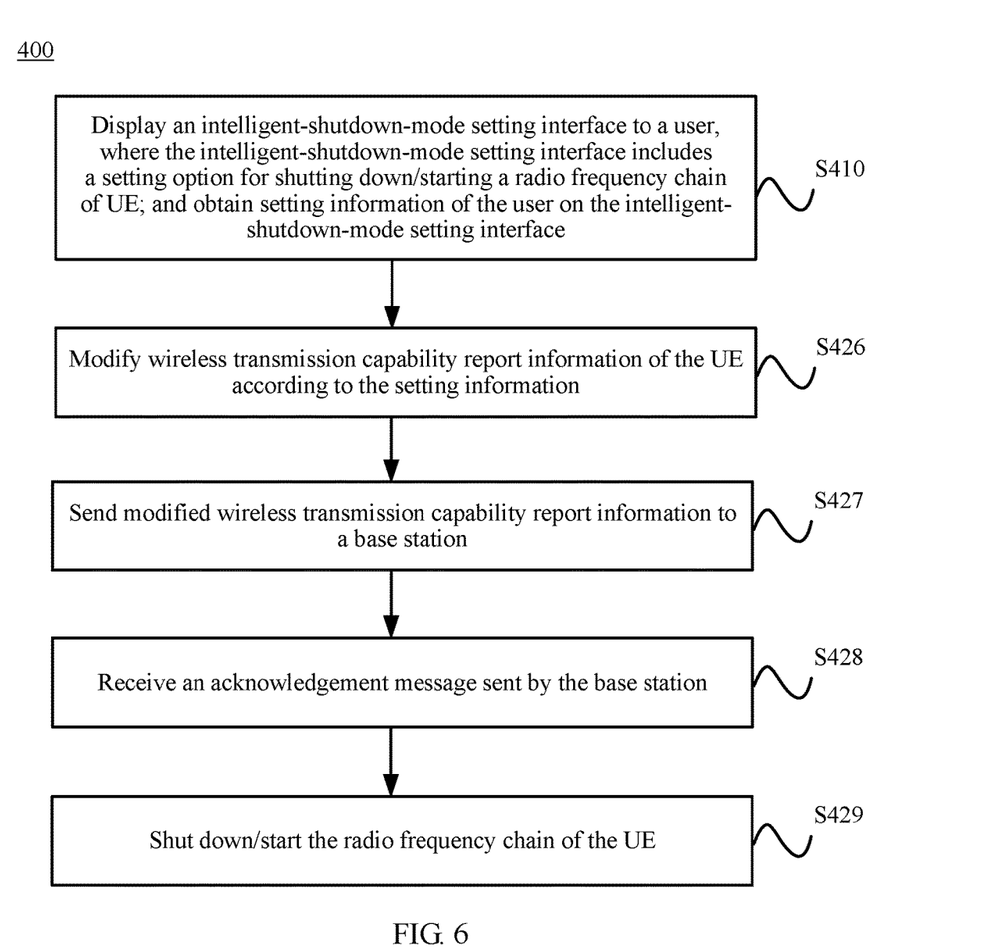
FIG. 6 is a schematic flowchart of a method for controlling UE according to still another embodiment of the present disclosure.

As shown in FIG. 6, in this embodiment, the method 400 may specifically include the following steps:

S410. Display the intelligent-shutdown-mode setting interface to the user, where the intelligent-shutdown-mode setting interface includes the setting option for shutting down/starting the radio frequency chain of the UE; and obtain the setting information of the user on the intelligent-shutdown-mode setting interface.

S426. Modify the wireless transmission capability report information of the UE according to the setting information.

S427. Send the modified wireless transmission capability report information to the base station.

S428. Receive an acknowledgement message sent by the base station.

S429. Shut down/start the radio frequency chain of the UE.

In this embodiment, the UE shuts down/starts the radio frequency chain of the UE after negotiating with the base station, that is, shuts down/starts the radio frequency chain of the UE after obtaining acknowledgement from the base station. Specifically, after obtaining the setting information of the user, the UE modifies the wireless transmission capability report information of the UE according to the setting information, where the wireless transmission capability report information of the UE is modified to be corresponding to the setting information, and sends the modified wireless transmission capability report information to the base station. After acknowledging the modified wireless transmission capability report information, the base station sends the acknowledgement message to the UE. After receiving the acknowledgement message, the UE shuts down/starts the radio frequency chain of the UE. Optionally, if the setting information is to enable the intelligent shutdown mode, a preset radio frequency chain is shut down. If the setting information is to enable the intelligent shutdown mode and a to-be-shut-down radio frequency chain is set, the to-be-shut-down radio frequency chain is shut down. If the setting information is to disable the intelligent shutdown mode, a shut-down radio frequency chain is started. After the base station acknowledges the modified wireless transmission capability report information of the UE, the UE shuts down/starts the radio frequency chain of the UE, and the base station may communicate with the UE according to the modified wireless transmission capability report information, so as to ensure normal communication with the UE. In addition, because shutting down a corresponding radio frequency chain can save energy, in this embodiment of the present disclosure, UE energy saving can be implemented on the premise that UE communication quality is ensured.

In this embodiment of the present disclosure, optionally, the method 400 further includes:

displaying a setting result on the intelligent-shutdown-mode setting interface to the user. That is, after the foregoing corresponding setting is finished, the UE displays the setting result on the intelligent-shutdown-mode setting interface to the user.

Therefore, in the method for controlling UE in this embodiment of the present disclosure, on the premise that UE communication quality is ensured, UE energy saving can be implemented by shutting down/starting a radio frequency chain of the UE and modifying wireless transmission capability report information of the UE. In addition, user experience can be improved by providing an operable intelligent-shutdown-mode setting interface to a user.

The method 400 for controlling UE in this embodiment of the present disclosure may be executed by the UE 100 in the foregoing embodiment of the present disclosure, and corresponding procedures of the method 400 may be respectively executed by modules of the UE 100.

It should be understood that the specific examples in the present disclosure are merely intended to help a person skilled in the art better understand the embodiments of the present disclosure, but are not intended to limit the scope of the embodiments of the present disclosure.

It should further be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

Figure 7:
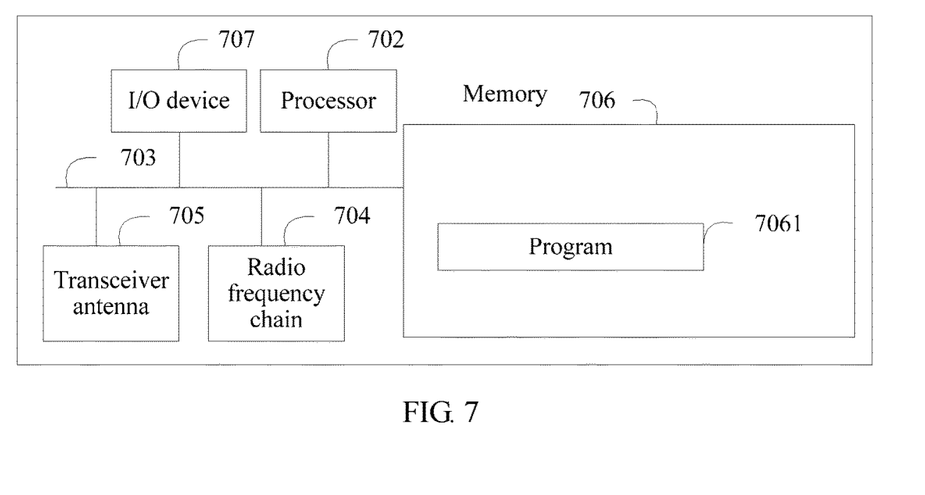
FIG. 7 is a schematic structural diagram of UE according to an embodiment of the present disclosure.

FIG. 7 shows a structure of UE according to another embodiment of the present disclosure. The UE includes at least one processor 702, a memory 706, multiple radio frequency chains 704, multiple transceiver antennas 705, an I/O device 707, and at least one communications bus 703 that is configured to implement connection and communication between these apparatuses. The processor 702 is configured to execute an executable module, such as a computer program, stored in the memory 706. The memory 706 may include a high-speed random access memory (RAM), or may further include a non-volatile memory such as at least one magnetic disk memory. Communication connection to at least one other network element is implemented by using at least one transceiver antenna 705.

In some implementation manners, the memory 706 stores a program 7061, and the processor 702 executes the program 7061 to execute the following operations:

displaying an intelligent-shutdown-mode setting interface to a user by using the I/O device 707, where the intelligent-shutdown-mode setting interface includes a setting option for shutting down/starting a radio frequency chain 704 of the UE; and obtaining setting information of the user on the intelligent-shutdown-mode setting interface; and modifying wireless transmission capability report information of the UE according to the setting information, sending modified wireless transmission capability report information to a base station by using a transceiver antenna 705, and shutting down/starting the radio frequency chain 704 of the UE.

Optionally, the processor 702 is configured to: according to the setting information, first shut down/start the radio frequency chain 704 of the UE, then modify the wireless transmission capability report information of the UE, and send the modified wireless transmission capability report information to the base station by using the transceiver antenna 705.

Optionally, the processor 702 is configured to: according to the setting information, first modify the wireless transmission capability report information of the UE, send the modified wireless transmission capability report information to the base station by using the transceiver antenna 705, and then shut down/start the radio frequency chain 704 of the UE after receiving, by using the transceiver antenna 705, an acknowledgement message sent by the base station.

Optionally, the processor 702 is configured to:

if the setting information is to enable an intelligent shutdown mode, shut down a preset radio frequency chain 704; or if the setting information is to enable an intelligent shutdown mode and a to-be-shut-down radio frequency chain 704 is set, shut down the to-be-shut-down radio frequency chain 704; or if the setting information is to disable an intelligent shutdown mode, start a shut-down radio frequency chain 704.

Optionally, the processor 702 is further configured to display a setting result on the intelligent-shutdown-mode setting interface to the user by using the I/O device 707.

It can be learned from the foregoing technical solution provided in this embodiment of the present disclosure that in this embodiment of the present disclosure, on the premise that UE communication quality is ensured, UE energy saving can be implemented by shutting down/starting a radio frequency chain of the UE and modifying wireless transmission capability report information of the UE.

It should be understood that, the term "and/or" in this embodiment of the present disclosure describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes:

any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A user equipment (UE), comprising:
    a memory storing instructions; and
    a processor configured to execute the instructions to cause the UE to:
        display an intelligent-shutdown-mode setting interface to a user, wherein the intelligent-shutdown-mode setting interface comprises a setting option for shutting down or starting a radio frequency chain of the UE;
        obtain setting information from the user on the intelligent-shutdown-mode setting interface;
        modify wireless transmission capability report information of the UE according to the setting information to generate modified wireless transmission capability report information;
        send the modified wireless transmission capability report information to a base station;
        receive an acknowledgement message sent by the base station; and
        after receiving the acknowledgement message, shut down or start the radio frequency chain of the UE according to the setting information.

2. The UE according to claim 1, wherein executing the instructions further causes the UE to:
    in response to determining that the setting information enables an intelligent shutdown mode, shut down a preset radio frequency chain; or
    in response to determining that the setting information enables an intelligent shutdown mode and a to-be-shut-down radio frequency chain is set, shut down the to-be-shut-down radio frequency chain; or
    in response to determining that the setting information disables an intelligent shutdown mode, start a shutdown radio frequency chain.

3. The UE according to claim 1, wherein executing the instructions further causes the UE to:
    display a setting result on the intelligent-shutdown-mode setting interface to the user.

4. A method for controlling a user equipment (UE), comprising:
    displaying an intelligent-shutdown-mode setting interface to a user, wherein the intelligent-shutdown-mode setting interface comprises a setting option for shutting down or starting a radio frequency chain of the UE;
    obtaining setting information from the user on the intelligent-shutdown-mode setting interface;
    modifying wireless transmission capability report information of the UE according to the setting information to generate modified wireless transmission capability report information;
    sending the modified wireless transmission capability report information to a base station;
    receiving an acknowledgement message sent by the base station; and
    after receiving the acknowledgement message, shutting down or starting the radio frequency chain of the UE according to the setting information.

5. The method according to claim 4, wherein the shutting down/starting the radio frequency chain of the UE comprises:
    in response to determining that the setting information enables an intelligent shutdown mode, shutting down a preset radio frequency chain; or
    in response to determining that the setting information enables an intelligent shutdown mode and a to-be-shut-down radio frequency chain is set, shutting down the to-be-shut-down radio frequency chain; or
    in response to determining that the setting information disables an intelligent shutdown mode, starting a shutdown radio frequency chain.

6. The method according to claim 4, further comprising:
    displaying a setting result on the intelligent-shutdown-mode setting interface to the user.

* * * * *